Aug. 7, 1951     A. H. LORD, JR., ET AL     2,562,929
PROSPECTING

Filed March 9, 1948     2 Sheets-Sheet 1

INVENTORS.
ARTHUR H. LORD, JR.
EVAN PANCAKE
BY
Daniel Stryker
ATTORNEY

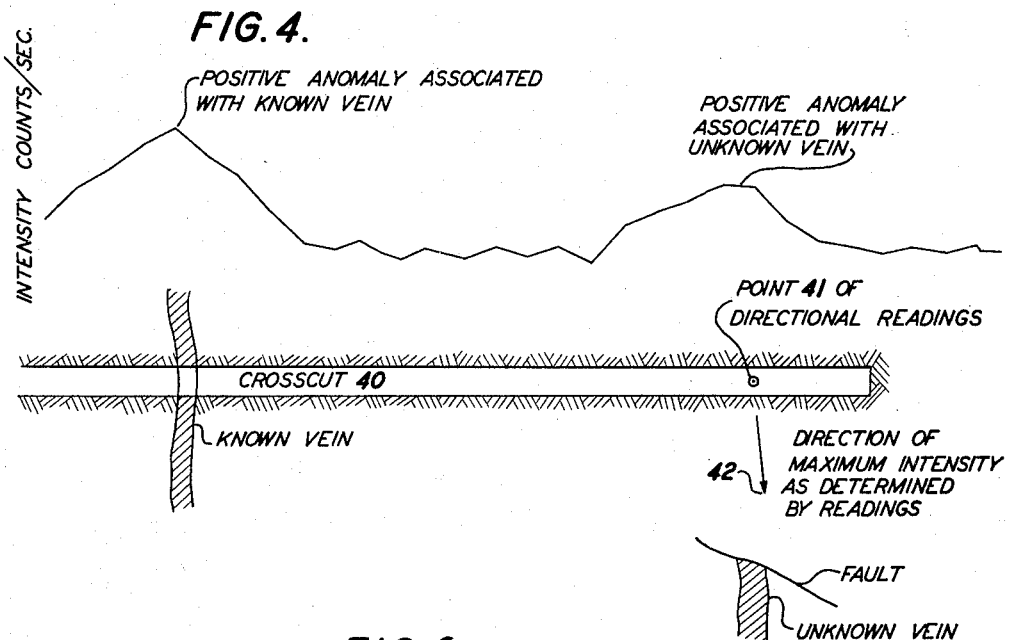
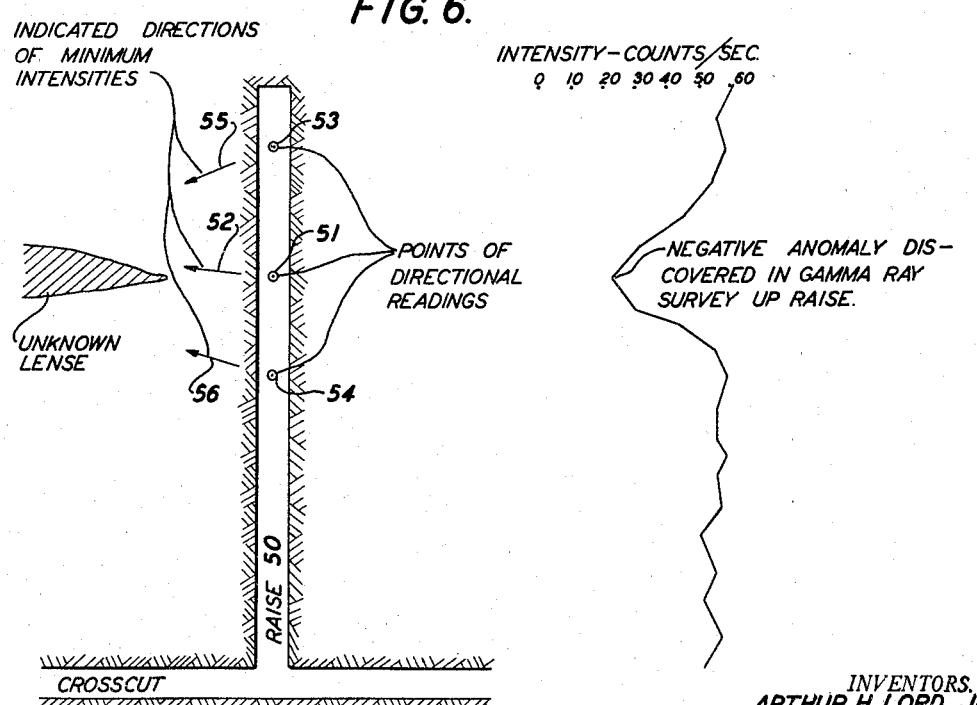

Patented Aug. 7, 1951

2,562,929

UNITED STATES PATENT OFFICE 2,562,929

PROSPECTING

Arthur H. Lord, Jr., Houston, and Evan Pancake, Bellaire, Tex., assignors to The Texas Company, New York, N. Y., a corporation of Delaware Application March 9, 1948, Serial No. 13,848

8 Claims. (Cl. 250—83.6)

This invention relates to prospecting and particularly to prospecting for metallic ores. The invention provides improvements in methods and apparatus for the location of mineral deposits involving the detection of gamma rays emitted from the earth and is particularly useful in underground operations.

As disclosed in co-pending application Serial No. 13,842, filed March 9, 1948 by Gerhard Herzog, the substantially barren country rock or overburden associated with an ore body or mineral deposit, which may or may not be radioactive itself, frequently is the source of gamma radiation. The intensity of the gamma radiation emitted by the rock in the neighborhood of the ore body varies from point to point, and may increase as the ore body is approached, thus presenting a positive anomaly, or it may decrease, in which case the anomaly is negative. The significant differences in gamma ray intensity which reveal the presence of the anomaly have been detected at distances of two hundred feet or more from the ore body with which the anomaly is associated. This is so far that gamma rays originating in the ore body itself can make no detectable contributions to the intensities determined, indicating that the anomalous gamma ray intensities originate in an aura outside the ore body.

Valuable ore bodies frequently lie hidden within a few feet of development workings such as raises, crosscuts, core holes, etc., and an anomaly indicative of the presence of such a body may be determined by measuring the intensity of gamma radiation along the working. Thus measurements of gamma ray intensities at intervals along a crosscut or raise may be made, with the result that a gamma ray "high" or a gamma ray "low" is discovered. From similar surveys across known ore bodies in the same mine or mining district it may be known that a particular type of deposit in that district (say a copper vein in granite) is characterized by a "high," i. e. by a positive anomaly, or it may develop that a particular type of deposit (say a zinc vein in sandstone) is characterized locally by a "low," i. e. by a negative anomaly. With such information as a guide, the detection of an anomaly in the survey of the crosscut indicates to the operator that he is near a hidden deposit, but the direction in which to dig or drill in search of the deposit is not defined. Thus, if it be assumed that a positive anomaly is detected in a survey of a crosscut, it remains to be determined whether the ore body with which the anomaly is associated is above, or below or to the right or left of the crosscut.

The instant invention provides a solution to the foregoing and similar problems in gamma ray prospecting and contemplates determining the direction from which the anomaly is manifested.

Thus the invention contemplates a gamma ray detector which is shielded from gamma radiations except on one face. By pointing this face in different directions and determining the corresponding detected gamma ray intensities, the direction from which the highest gamma radiation intensity comes may be determined, thus indicating in which direction to go to discover a mineral deposit associated with a positive anomaly. The same procedure may be employed to detect the direction from which the lowest gamma radiation intensity comes, thus indicating the direction to take in seeking a mineral deposit associated with a negative anomaly.

In the practice of the invention, detectors having a relatively high efficiency for gamma rays should be employed in order to reduce the required observation time and to increase the contrast between readings. We prefer to employ detectors or counters of the multiple cathode type such as those described and claimed in United States Patent No. 2,397,071 granted March 19, 1946. Such detectors have an efficiency for gamma rays that is several times, at least 4 or 5, that of conventional Geiger-Mueller counters having a tubular cathode with a coaxial wire anode. However, other high efficiency detectors of the crystal type (which employ a diamond or the like as a detecting element) may be employed, as well as those of the type in which gamma rays produce scintillations on a naphthalene screen, the scintillations being amplified with a photomultiplier tube.

The shield should be of such material and such thickness that it effectively absorbs gamma radiation which seeks to penetrate the shield. Two inches or more of lead provides satisfactory shielding in many cases.

It is convenient to mount the detector on a base upon which it is rotatable through both horizontal and vertical arcs, with means similar to those on a transit for indicating the horizontal and vertical angles corresponding to each reading of gamma ray intensity.

In underground surveying in accordance with the invention the detector should be set up approximately at the peak of an anomaly previously discovered by measurements taken along the mine working, say a crosscut. The direction of maximum or minimum intensity, as the case may be, is determined at this point. For check purposes, observations may be made at other points along the opening, and by trigonometry, some indication of the distance from the observation points to the ore body may be had, as explained hereinafter.

These and other aspects of the invention will be understood more thoroughly in the light of the following detailed description taken in conjunction with the accompanying drawings in which:

Fig. 4 is a diagram illustrating the practice of the invention in an underground operation for the investigation of a positive anomaly discovered in a survey along a crosscut;

Fig. 6 is a diagram illustrating the investigation of a negative anomaly discovered in a gamma ray survey of a raise which is close to but does not intercept an ore body sought to be discovered.

Figure 1:
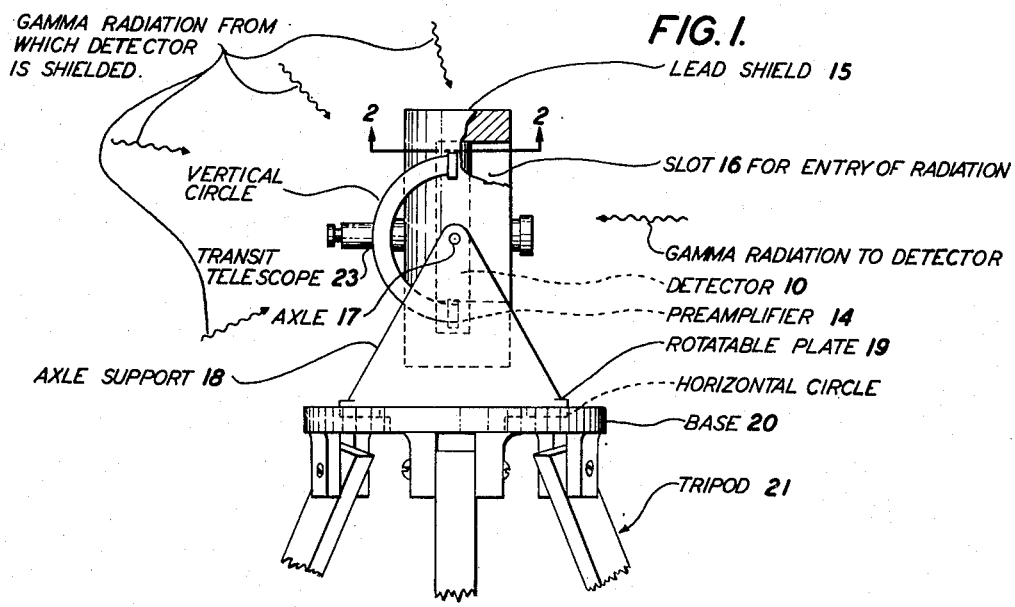
Fig. 1 is an elevation of an apparatus for the practice of the invention provided with a shielded directionally sensitive counter, a mount, and means for determining the direction of the radiation being measured.
Figure 2:
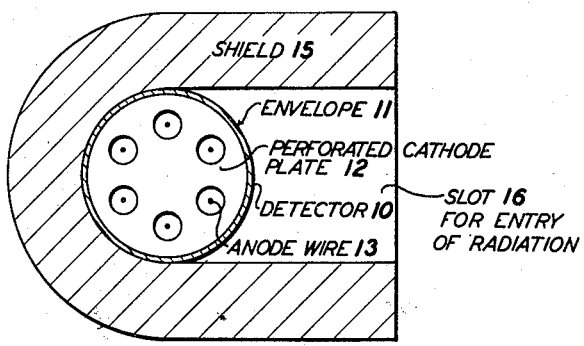
Fig. 2 is an enlarged section through the counter and shield of Fig. 1 taken along the line 2—2.

The instrument of Figs. 1 and 2 is provided with a radiation detector 10 having a high efficiency for gamma rays, say one construtced in accordance with United States Patent No. 2,397,071 granted March 19, 1946. Such a detector may comprise a cylindrical metal envelope of brass 11 (See Fig. 2), within which there is a series of thin silver cathode plates 12 spaced from each other and extending perpendicular to the axis of the cylinder. One or more anode wires 13 of tungsten run through the plates parallel to the axis, the plates being provided with a series of aligned holes through the centers of which the anodes pass. The anodes are connected in parallel with each other, as are the cathodes. A high D. C. power supply (not shown) establishes a potential difference between anodes and cathodes. The envelope is filled with an ionizable gas, say a mixture of argon and alcohol, and in operation the D. C. potential difference between anodes and cathodes is established at a level just below that at which a discharge will occur. If the gas filling is ionized by an entering ray, say a gamma ray, there is a momentary drop in resistance between anode and cathode, and the counter will discharge or "count." By employing a suitable gas filling to give self-quenching characteristics to the counter or by employing a conventional quenching circuit (not shown) the discharge may be quenched quickly, whereupon the counter is again ready to register radiation.

The output of the detector is amplified and recorded in any conventional fashion. Thus the detector may be equipped with an electronic preamplifier 14, mounted as shown on one end of the detector within the shield. The output of the preamplifier is further amplified in a conventional amplifier (not shown), which may include an integrating circuit, such as a resistance-condenser combination, which averages out the pulses originating in the detector over a fixed time period and gives a continuous D. C. output representative of the average intensity of the radiation detected from time period to time period. This output is recorded by a conventional recorder such as a milliammeter.

In another conventional output system for radiation detectors, no integrating circuit is employed, and instead the individual amplified pulses from the amplifier are indicated separately, say by controlling the grid of a gas trigger tube, the output of which is recorded or indicated. Thus the output may be connected to a neon tube which flashes for each count or to an indicator that gives an audible click for each count, or predetermined number of counts, (assuming in the latter case that a scaling circuit is employed). By such means the number of counts per unit time is determined, this being the measure of the intensity of the detected radiation. In order to keep constant the probable error in a series of observations made with such equipment, a fixed number of counts, say 1000, should be taken on each occasion, the time of observation being permitted to vary and accurately determined with a stopwatch or the like.

Returning to Figs. 1 and 2, the detector and its preamplifier are housed in a shield 15 which is a lead case having an elongated slot 16 on one side through which the detector is exposed to radiation. The shield is rotatably mounted on an axle 17 which is perpendicular to the axis of shield and detector. The axle is supported by a pair of upright axle supports 18 which are fastened rigidly to a circular rotatable plate 19. This rests in a recessed base 20, supported on an adjustable tripod 21.

A vertical circle member is fastened to the shield on a plane perpendicular to the axle so that it rotates around it. A horizontal circle is marked on the base adjacent the rotatable plate.

A telescope or similar sighting means 23 is fastened rigidly to one side of the shield, preferably immediately above the center of the rotatable plate. The telescope shown is of the type employed in surveying and is equipped with cross hairs, etc., for sighting. The line-of-sight of the telescope passes through the axle and is perpendicular thereto, so that in effect the apparatus comprises a directionally shielded gamma radiation detector mounted on one side of the sighting means of a transit. The sighting means is employed to determine the azimuth of the detector, as in conventional surveying procedures.

Figure 3:
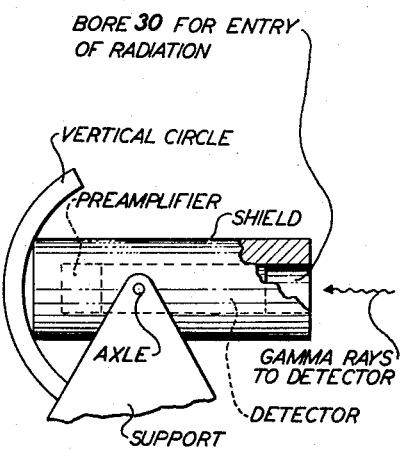
Fig. 3 illustrates a modification of the apparatus of Fig. 1 in which an end rather than a side portion of the counter is exposed.

The apparatus of Fig. 3 is identical with that of Figs. 1 and 2 except that the shield encloses the counter on all sides and on one end; the other end having a bore 30, concentric with the counter, through which radiation may enter.

Figure 5:
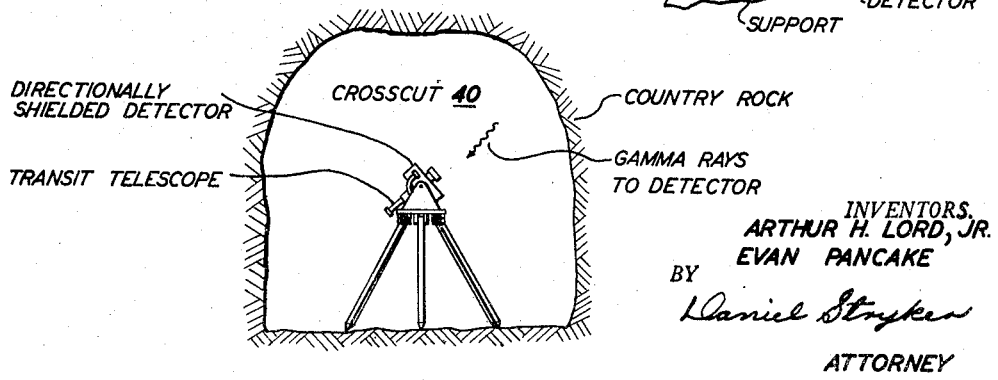
Fig. 5 is a section through the crosscut of Fig. 4 showing the instrument of Figs. 1 and 2 in operating position.

The use of the apparatus just described in an underground survey is illustrated by Figs. 4 and 5. A survey has been made along the crosscut 40, which crosses a known vein, by measuring the gamma ray intensities at a series of spaced points, say at 10 foot intervals, along the crosscut, in accordance with the method of the aforementioned co-pending application by Gerhard Herzog. The results of this survey are plotted in the upper portion of Fig. 4 with gamma ray intensity as ordinate and with the traverse along which the intensities were observed as abscissa. A strong positive anomaly is found to be associated with the known vein, with an increase in the intensity of gamma ray intensity from the country rock as the vein is approached from either side. To the right of the known vein another positive anomaly occurs, but this is not accompanied by an exposed ore body. However, since the geological conditions are generally the same at the locations corresponding to the two anomalies, there is an indication that there may be an unknown vein in the neighborhood where the second anomaly is encountered. However, since the observations which detected the anomalies were made with an unshielded counter, which received gamma rays from all directions, it remains to be determined in which direction to go in order to encounter the unknown vein indicated by the second anomaly. This is accomplished in accordance with the instant invention by setting up the instrument of Figs. 1 and 2 (with its base level) in the approximate center of the crosscut 40 adjacent the point 41 on the traverse corresponding to the maximum intensity of the second anomaly. With the detector thus set up, its unshielded side is pointed in various directions. Each time the intensity of the detected gamma radiation is observed, and the direction considered in three dimensions, is determined by noting the azimuth and the vertical angle. In many instances it will be found that there is a single direction from which a maximum intensity of gamma radiation is detected, for example the direction 42 noted on Fig. 4. This indicates the general direction to pursue in search of the unknown vein. Subsequent operations may involve core drilling or a larger exploration opening, say a further crosscut, in the direction indicated.

If core drilling is chosen for this further exploration, succeeding core samples should be examined by the method described and claimed in co-pending application Serial No. 13,845, filed March 9, 1948, by Herzog, Stratford, and Teichmann to determine whether gamma radiation emitted by successive core samples increases. If there is such an increase in intensity as the core drilling proceeds, there is further evidence that an unknown ore body (which is manifested by a positive anomaly originating in the neighboring country rock) is being approached.

If, in the drilling operations, no ore is taken, a survey may be made along the bore hole according to the method described and claimed in the aforementioned co-pending application of Gerhard Herzog, by running a small diameter detector along the bore and observing detected gamma ray intensities along the traverse thus made. Again, increasing intensities as the bore hole is deepened indicate that the unknown ore body is being approached.

The operation illustrated in Fig. 6 is essentially the same as that of Fig. 4 except that the original gamma ray survey is made vertically along a raise 50. In this case it is known that deposits already discovered in the mine being explored are associated with negative anomalies, and a search has been made to discover further negative anomalies which may be associated with as yet undiscovered deposits of like character. The survey up the raise, as indicated on the right of Fig. 6, has revealed a marked negative anomaly in gamma ray intensity. Such being the case, the apparatus of Figs. 1 and 2, or that of Fig. 3, is set up at the point 51, corresponding to the minimum intensity of the negative anomaly, and readings are taken until the direction from which the minimum intensity comes is determined. This direction is indicated on Fig. 6 by the line 52.

At this time, further exploration by drilling or crosscutting may be begun, as previously described. However, Fig. 6 illustrates a further survey operation which may be conducted in accordance with the instant invention with a view to further investigating the anomaly. In this operation, which is described with reference to the negative anomaly of Fig. 6, but which is equally applicable to the investigation of positive anomalies (in which case the direction corresponding to maximum intensity is determined) the detection apparatus is set up at points 53, 54 respectively above and below the point 51, and the directions 55, 56 corresponding respectively to minimum detected intensities at the two points are determined. The directions thus determined tend to confirm the observations taken at the point 51. In addition, they may tend to show that the unknown ore body being sought is a generally flat-lying elongated lens. By continuing the lines 52, 55 and 56 until they intersect or at least, considered in three dimensions, approach within minimum distances of each other, a general idea of the distance from the observation points to the deposit sought may be obtained. This is particularly true if a prior detailed survey of a known deposit of the same type has been made in the mine in question, in order to correlate directional readings of intensity with the distances between observation points and the known deposit. Thus in some cases, the invention provides means for determining approximate distances to a buried deposit by triangulation.

Although the invention finds its major application in underground operations, it may also be employed in surveys of a surface overlying a zone in which an anomaly (possibly indicative of a buried ore deposit) has been discovered. Additional information made available through directional measurement of gamma rays at a number of spaced points on the surface may be useful in giving some idea of the shape and location of the deposit, in addition to confirming the information obtained in gamma radiation surveys of other types, say those disclosed in the aforementioned application of Gerhard Herzog, involving the measurement of gamma ray intensities emitted from the rock mass at the site, or those disclosed by Herzog, Stratford, and Teichmann in co-pending application Serial No. 13,845, filed March 9, 1949, involving the taking of samples and the determination of the intensity of gamma radiation from these samples after they have been isolated from the mass.

Although the invention is concerned primarily with the determination during prospecting of the direction from which gamma radiation of a given intensity is emitted, some advantage accrues to shielding a detector employed in prospecting from gamma radiation originating in other than the earth. Cosmic rays have a number of components, including gamma radiation and "penetrating particles" to which radiation detectors in general are sensitive, and the detection of such radiation together with that received from the earth tends to reduce contrast between readings taken at different locations with a view to determining the difference in the intensity of gamma radiations emitted by rock adjacent the several locations. Hence the invention, in its broad aspect, contemplates shielding against the gamma ray component of cosmic radiation during the determination of gamma radiation emitted by the earth, for example by disposing a detector sensitive to gamma radiation adjacent an earth surface and measuring the intensity of the gamma radiation detected while shielding the detector from gamma radiation arriving from other than the earth surface. This is accomplished with the apparatus of Figs. 1 and 2, for example, in a survey conducted above the ground by pointing the slot of the shield downward to the earth. The shield thus intercepts cosmic radiation arriving from outer space and largely absorbs its gamma ray components.

We claim:

1. In prospecting, the improvement which comprises locating a gamma ray anomaly manifested by differences in the intensity of gamma rays emitted from different locations on a traverse along an earth surface, and determining the direction of origin of the anomaly by disposing a detector sensitive to gamma radiation at a location in the neighborhood where the anomaly is manifested, and determining the intensity of gamma radiation arriving at the detector so located from a plurality of different directions by shielding the detector from gamma radiation arriving at the detector from all directions except the one under investigation, orienting the detector in different directions towards the earth's surface and measuring the intensity of gamma radiation in each direction.

2. Process according to claim 1 in which the anomaly is positive and the direction from which gamma radiation of maximum intensity arrives at the location is determined.

3. Process according to claim 1 in which the anomaly is negative and the direction from which gamma radiation of minimum intensity arrives at the location is determined.

4. Process according to claim 1 in which the earth surface and the traverse are underground.

5. Process according to claim 1 in which the earth surface and the traverse thereof are underground and the detection of the intensity of gamma raditation arriving from a plurality of directions is made at a plurality of locations in the neighborhood of the anomaly.

6. In prospecting, the improvement which comprises locating a gamma ray anomaly manifested by differences in the intensity of gamma rays emitted from different locations in an underground traverse, and determining the direction of origin of the anomaly by disposing a detector sensitive to gamma radiation substantially at the point of the maximum anomaly, and determining the intensity of gamma radiation arriving at the detector while shielding the detector from radiation arriving at the detector from all directions except the one under investigation, orienting the detector in different directions, and measuring the intensity of gamma radiation in each direction.

7. A process according to claim 6 in which the anomaly is positive and the direction from which gamma radiation of maximum intensity arrives at the location is determined.

8. A process according to claim 6 in which the anomaly is negative and the direction from which gamma radiation of minimum intensity arrives at the location is determined.

ARTHUR H. LORD, Jr.
EVAN PANCAKE.

REFERENCES CITED

The following references are of record in the file of this patent:

UNITED STATES PATENTS

| Number | Name | Date |
|---|---|---|
| 1,343,393 | Hoffman | June 15, 1920 |
| 2,316,361 | Piety | Apr. 13, 1943 |
| 2,386,785 | Friedman | Oct. 16, 1945 |
| 2,392,873 | Zahl | Jan. 15, 1946 |
| 2,444,933 | Jasperson | July 13, 1948 |

OTHER REFERENCES

Locher and Weatherwax: Radiology, vol. 27, 1936, pp. 149–157.

Heiland: Geophysical Exploration, Prentice Hall, 1940, pp. 873–876 and 883–885.